United States Patent
Yang et al.

(10) Patent No.: US 7,304,936 B2
(45) Date of Patent: Dec. 4, 2007

(54) METHOD AND APPARATUS FOR CONTROLLING POWER OF LASER DIODE IN OPTICAL DISC DRIVE

(75) Inventors: Sung-un Yang, Suwon-si (KR); Sung-ro Go, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 540 days.

(21) Appl. No.: 10/859,290

(22) Filed: Jun. 3, 2004

(65) Prior Publication Data

US 2005/0041562 A1    Feb. 24, 2005

(30) Foreign Application Priority Data

Jun. 24, 2003    (KR) .................... 10-2003-0041061

(51) Int. Cl.
*G11B 7/00* (2006.01)

(52) U.S. Cl. .................. 369/116; 369/106; 372/29.011

(58) Field of Classification Search ................ 369/116, 369/53.26, 47.5, 47.51, 59.11, 106; 372/29.01, 372/29.011, 29.014, 29.02, 29.021
See application file for complete search history.

(56) References Cited

U.S. PATENT DOCUMENTS 6,222,815 B1 *    4/2001    Nagano .................... 369/47.51
7,057,990 B1 *    6/2006    Seo ......................... 369/47.52

FOREIGN PATENT DOCUMENTS

JP    07030398 A    *    1/1995
JP    11-273077        10/1999

* cited by examiner

*Primary Examiner*—Thang V. Tran
(74) *Attorney, Agent, or Firm*—Staas & Halsey LLP

(57) ABSTRACT

A method of and an apparatus for controlling a power of a light emitter in an optical disc drive to stabilize a servo control operation by efficiently compensating a slow tail effect occurring in a photodiode monitoring outputs of the light emitter are provided. The method includes: detecting an intensity of a laser signal reflected from a recording medium; normalizing the reference value using the detected value; and adjusting the reference value using the normalization result.

28 Claims, 7 Drawing Sheets

METHOD AND APPARATUS FOR CONTROLLING POWER OF LASER DIODE IN OPTICAL DISC DRIVE

CROSS-REFERENCE TO RELATED APPLICATION

This application claims the priority of Korean Patent Application No. 2003-41061, filed on Jun. 24, 2003, in the Korean Intellectual Property Office, the disclosure of which is incorporated herein in its entirety by reference.

BACKGROUND OF THE INVENTION

1. Field of the Invention

The present invention relates to optical disc drives, and more particularly, to a method of and an apparatus for controlling a power of a laser diode in an optical disc drive to stabilize a servo control operation by efficiently compensating for a slow tail effect occurring in photodiode monitoring outputs of the laser diode.

2. Description of Related Art

Data is recorded on an optical disc by forming marks/spaces on tracks of the optical disc. In a read-only disc such as a CD-ROM and a DVD-ROM, a mark is formed as a pit. In a recordable disc such as a CD-R/RW and DVD-R/RW/RAM, a mark is formed by irradiating a laser signal on a phase-change-type recording film (RW series), which is converted into one of a crystalline state and an amorphous state according to a temperature, or an organic color coating recording film (R and RAM series) in which optical transmittance is varied according to a temperature.

Until now, the data processing speed of an optical disc drive has been increased by increasing the rotation speed of the disc. Generally, the rotation speed of a conventional disc drive is 60 times faster than the normal reproduction speed. However, as the rotation speed of the optical disc drive increases, a higher recording frequency is required. And, as the recording frequency increases, servo control becomes more unstable.

Another important cause that severely affects the servo control is a slow tail effect due to a slew rate characteristic of a photodiode monitoring an output of a laser diode.

The slew rate is an index representing how fast an output signal replies to an input signal in the photodiode or an operational amplifier, and is computed as slew rate=output voltage variation ($\Delta V$)/time variation ($\Delta t$) [V/$\mu$S].

The slew rate characteristic of the photodiode is inevitable and occurs due to carrier diffusion. The slew rate characteristic causes the slow tail effect due to which the output signal, i.e., an output of the photodiode, is not perfectly proportional to the input signal, i.e., an output of the laser diode, during a specified period of time. The faster the recording speed, the greater the influence of the slow tail effect.

Because of the slow tail effect, the output of the laser diode, which is sampled by an apparatus controlling the laser diode, becomes unstable. That is, since the photodiode cannot smoothly reflect the output of the laser diode when the slow tail effect occurs, the output level of the laser diode, as well as a read level of the laser signal, becomes unstable.

In general, since a servo system of the optical disc drive is designed in consideration of the read level of the laser signal, if the read level of the laser signal becomes unstable, a servo control operation becomes unstable too.

Experimental results regarding the slow tail effect show that the servo control operation becomes unstable at velocities higher than a 16× velocity, and a servo control signal level decreases by more than 30% at a 48× velocity.

To remove or reduce the effects of the slow tail effect, in a conventional method, the read level of the laser signal is compensated with a specified value in a section where the slow tail effect occurs, or sampling in a read section is performed at the end of the read section if possible.

However, the method of compensating the read level of the laser signal with the specified value cannot exactly reflect the influence of the slow tail effect. Also, since deviations according to different devices and deviations according to using conditions and used period of times even in the same device are not considered, reliability is low. In the method of controlling the sampling, since a faster recording speed requires a more accurate sampling control, the devices for performing the method are expensive, and even though the sampling is accurately controlled, a residual error still remains.

BRIEF SUMMARY

The present invention provides a method of controlling a power of a laser diode to efficiently compensate a slow tail effect by a photodiode monitoring an output of the laser diode so that a servo control operation is stable even though a recording speed is faster.

The present invention also provides an apparatus suitable for the method.

According to an aspect of the present invention, there is provided a method of controlling a power of a light emitter to stabilize an output level of a laser diode by comparing a reference value and a sampling output value of a photodiode monitoring the output of the light emitter and by controlling the output of the light emitter according to the comparison result, the method including: detecting an intensity of a laser signal reflected from a recording medium; normalizing the reference value using the detected intensity; and adjusting the reference value using the normalization result.

According to another aspect of the present invention, there is provided an apparatus for controlling a power of a laser diode to stabilize an output level of a light emitter by comparing a reference value and a sampling output value of a photodiode monitoring the output of the light emitter and by controlling the output of the light emitter according to the comparison result, the apparatus including: a sample and hold device which detects an intensity of a laser signal reflected from a disc; a normalizer which normalizes the reference value using the value sampled by the sample and hold device; and a controller which adjusts the reference value using an output of the normalizer.

According to another aspect of the present invention, there is provided a computer-readable storage medium encoded with processing instructions for causing a computer to perform a method of controlling a power of a light emitter to stabilize an output level of the light emitter by comparing a reference value and a sampling output value of a photodiode monitoring the output of the light emitter and by controlling the output of the light emitter according to the comparison result. The method includes: detecting an intensity of a laser signal reflected from a recording medium; normalizing the reference value using the detected intensity; and adjusting the reference value using the normalization result.

According to another aspect of the present invention, there is provided a method of removing the influence of a slow tail effect, including: comparing a read level of a laser signal controlled by an automatic power controller and a reference value for controlling the read level; and changing a reference value according to a result of the comparing.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
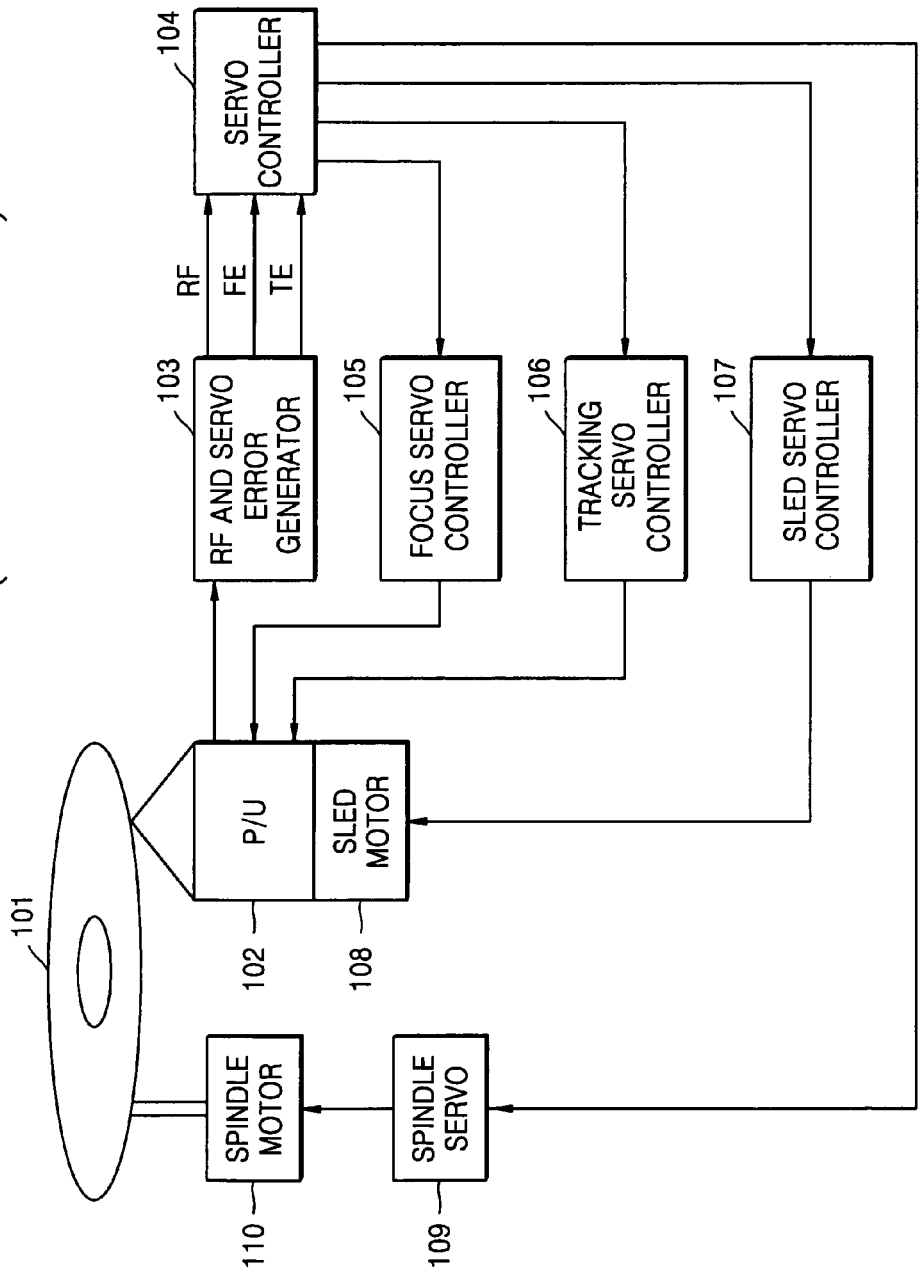
FIG. 1 is a block diagram of a conventional optical disc recording/reproducing apparatus.

Reference will now be made in detail to embodiments of the present invention, examples of which are illustrated in the accompanying drawings, wherein like reference numerals refer to the like elements throughout. The embodiments are described below in order to explain the present invention by referring to the figures.

For a better understanding of the present invention and related art, a conventional optical disc recording/reproducing apparatus will now be schematically described.

FIG. 1 is a block diagram of a conventional optical disc recording/reproducing apparatus.

An optical pickup 102 irradiates a light beam combined through an objective lens on a signal track of an optical disc 101 under control of a servo controller 104, combines the light beam reflected from a signal recording film through the objective lens, and makes the reflected light beam incident upon an optical detector (not shown) for detecting a focus error signal and a tracking error signal.

The optical detector includes a plurality of optical detection components (usually 4-split or 8-split). An optical detection signal proportional to intensity of radiation obtained from each of the plurality of optical detection components is output to an RF and servo error generator 103.

The RF and servo error generator 103 generates an RF signal for data reproduction and focus error (FE) and tracking error (TE) signals for a servo control using the optical detection signal output from each of the plurality of optical detection components of the optical detector.

The generated RF signal is output to a data decoder (not shown) for the data reproduction, and servo error signals, such as the FE signal and the TE signal, are output to the servo controller 104.

The servo controller 104 outputs a driving signal for a focusing control to a focus servo driver 105 by processing the FE signal and a driving signal for a tracking control to a tracking servo driver 106 by processing the TE signal.

The focus servo driver 105 drives a focusing actuator of the optical pickup 102, moves the optical pickup 102 up and down, and makes the optical disc 101 follow the up and down movement while rotating.

The tracking servo driver 106 drives a tracking actuator of the optical pickup 102, corrects a light beam position by moving the objective lens of the optical pickup 102 in a radial direction, and tracks a specified track. When a normal record/reproduction operation or a fine seek is performed, the tracking servo driver 106 drives the tracking actuator and moves the objective lens of the optical pickup 102 toward the radial direction.

When a rough seek, by which a main body of the optical pickup 102 must be moved, is performed, a sled servo driver 107 directly moves the main body of the optical pickup 102 to a desired direction by inputting a sled control signal from the servo controller 104 and driving a sled motor 108.

The servo controller 104 also detects disc rotation speed information from the RF signal and outputs the disc rotation speed information to a spindle servo 109. The spindle servo 109 rotates the optical disc 101 by performing a phase locked loop (PLL) control of a spindle motor 110 according to the disc rotation speed information. That is, the spindle motor 110 forces a spindle (not shown) to rotate the optical disc 101, and the spindle transfers a turning force obtained by the spindle motor 110 to the optical disc 101 and rotates the optical disc 101 with a desired speed.

Figure 2A:
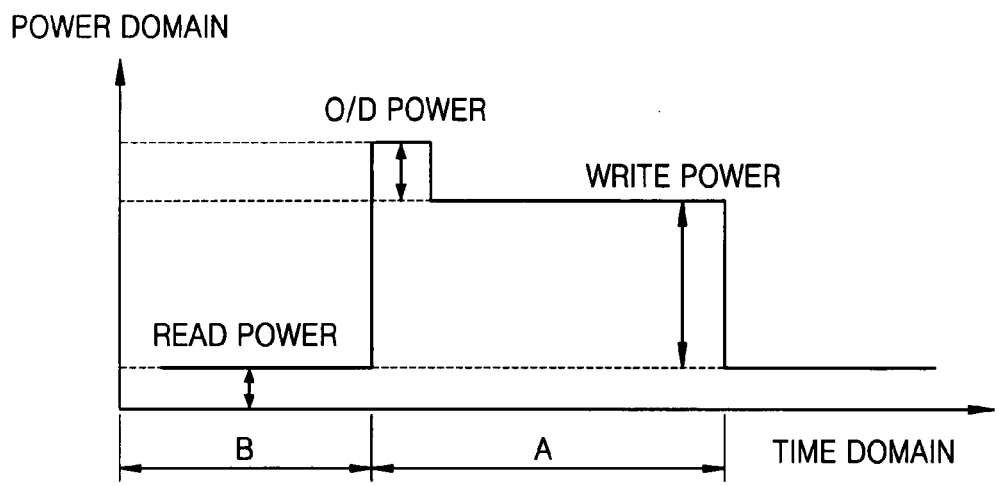
FIGS. 2A and 2B are waveform diagrams of conventional laser signals for recording data on a recording medium.
Figure 2B:
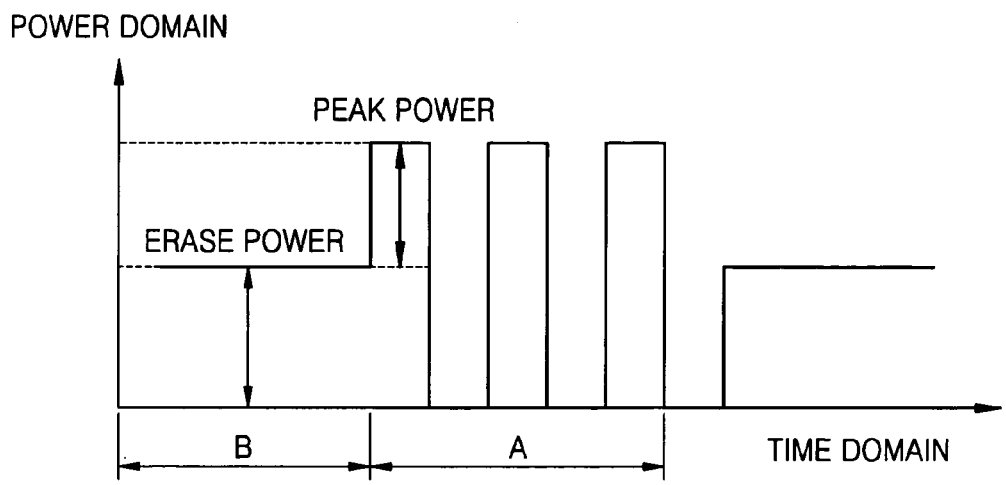

FIGS. 2A and 2B are waveform diagrams of conventional laser signals for recording data on a recording medium.

FIG. 2A represents a waveform diagram of a laser signal for recording data on a CD-R. Three channel signals, a read channel, a write channel, and an overdrive channel, are necessary for driving a laser diode, and the laser signal illustrated in FIG. 2A is generated by inputting the three channel signals to a driving circuit.

A mark is formed on the recording medium in a write power conducting section (section A of FIG. 2A, a write section), and a space is formed on the recording medium in a read power conducting section (section B of FIG. 2A, a read section). In the write section, a recording film formed on the recording medium is heated by a high power laser signal, and accordingly, an optical transmittance of organic color coated on the recording film is changed. A ratio between a write power and a read power is about 100:1. For example, when the write power in the write section is about 100 mW, the read power in the read section is about 1 mW.

FIG. 2B represents a waveform diagram of a laser signal for recording data on a CD-RW. Three channel signals, a bias power channel, an erase power channel, and a peak power channel, are necessary for driving the laser diode, and the laser signal illustrated in FIG. 2B is generated by inputting the three channel signals to the driving circuit. A bias power is not used for generating the laser signal of FIG. 2B. The data is recorded on the recording medium in a peak power output section (section A of FIG. 2B) and erased in an erase power only output section (section B of FIG. 2B).

Figure 3:
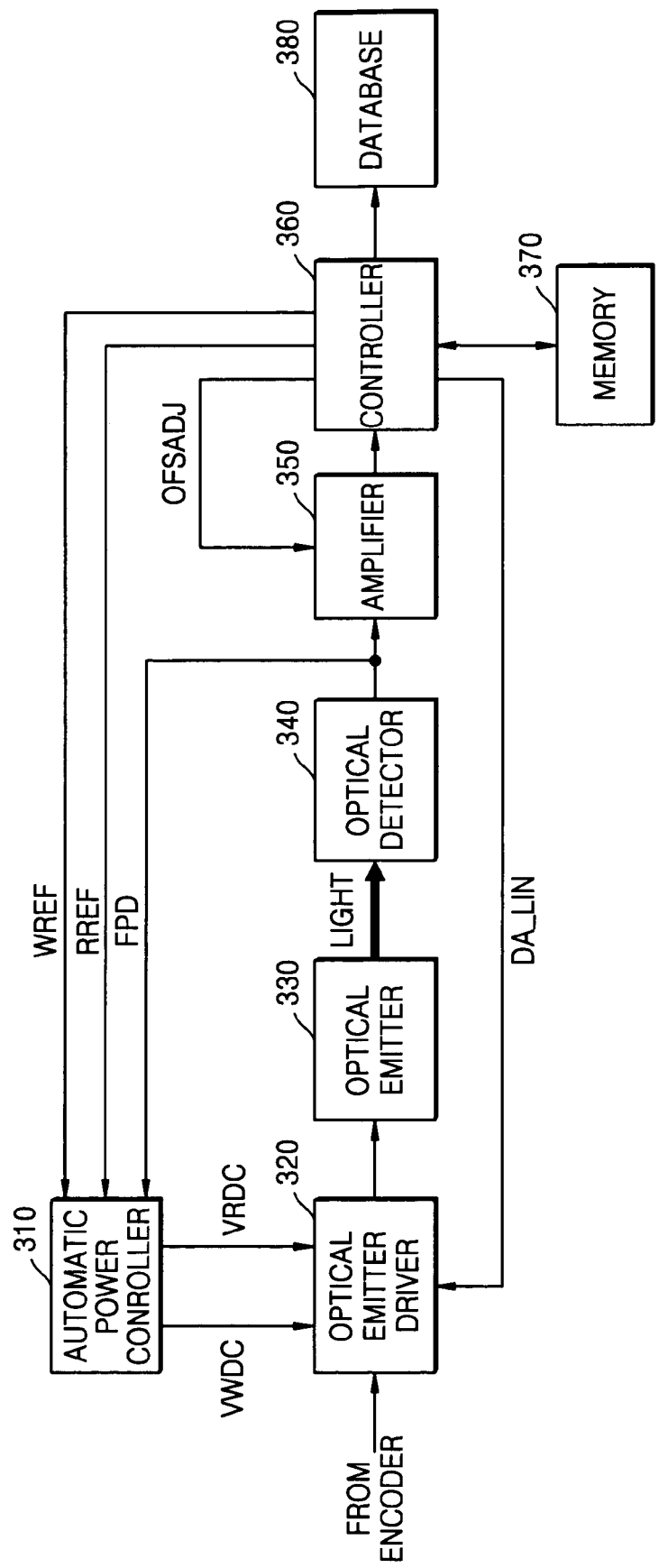
FIG. 3 is a block diagram of a conventional apparatus for controlling a power of a laser diode.

FIG. 3 is a block diagram of a conventional apparatus for controlling a power of a laser diode. The apparatus of FIG. 3 includes an automatic power controller 310, a light emitter driver 320, a light emitter 330, an optical detector 340, an amplifier 350, a controller 360, a memory 370, and a database 380.

The automatic power controller 310 receives reference signals WREF and RREF from the controller 360 and a feedback signal FPD of the optical detector 340, compares each of the reference signals WREF and RREF and the feedback signal FPD of the optical detector 340, and outputs channel signals VWDC and VRDC corresponding to each of the reference signals WREF and RREF to maintain an output level of the light emitter 330.

The light emitter driver 320 receives the channel signals VWDC and VRDC from the automatic power controller 310. Also the light emitter driver 320 directly inputs an overdrive power channel signal DA_LIN from the controller 360. Therefore, the channel signals VWDC and VRDC are input to the light emitter driver 320 through a closed loop, and the overdrive power channel signal DA_LIN is input to the light emitter driver 320 through an open loop since the overdrive power channel signal DA_LIN is directly input from the controller 360.

The light emitter driver 320 inputs the channel signals VWDC, VRDC, and DA_LIN respectively from the automatic power controller 310 and the controller 360 and on/off signals for the channel signals VWDC, VRDC, and DA_LIN from an encoder (not shown) and outputs a driving signal, in which currents according to the channel signals VWDC, VRDC, and DA_LIN are synthesized, to the light emitter 330. Accordingly, the light emitter 330 generates the laser signal such as the laser illustrated in FIG. 2A.

The light emitter 330 receives the driving signal from the light emitter driver 320 and outputs a light signal corresponding to the driving signal. A laser diode is a non-limiting example of the light emitter 330.

The optical detector 340 detects an intensity of the light emitted from the light emitter 330, generates a current corresponding to the intensity of the light, and converts the current into a voltage using an I/V amplifier (not shown). A photodiode is a non-limiting example of the optical detector 340 and is ordinarily integrated with the laser diode.

The amplifier 350 amplifies the signal FPD output from the optical detector 340 and outputs the amplified signal to the controller 360. The amplifier 350 generates a computing error using an offset due to its own circuit characteristics. To remove the offset, the controller 360 outputs an offset control signal OFSADJ with a specified value to one input terminal of the amplifier 350 as a bias signal. Also, the controller 360 determines a value measuring an output of the amplifier 350 while the offset adjust signal OFSADJ is conducted to the amplifier 350 as the offset, abstracts the offset from all the signals FPD, which are output from the optical detector 340, measured after the determination, and removes the offset between an output value of the optical detector 340 and an input value of the controller 360.

The controller 360 outputs the reference signals WREF and RREF to the automatic power controller 310, the overdrive power channel signal DA_LIN to the light emitter driver 320 directly, and the offset adjust signal OFSADJ to the amplifier 350.

According to a control of the controller 360, the memory 370 stores and outputs reference values for an automatic laser power control, or inputs and stores data and outputs the data for a computing operation of the controller 360. The memory 370 is a nonvolatile memory, and data storage components, such as an EEPROM, are used for the memory 370.

The database 380 stores different overdrive ratios according to disc types and data including an optimum value of a base power output signal and outputs the data to the controller 360 under the control of the controller 360.

Figure 4:
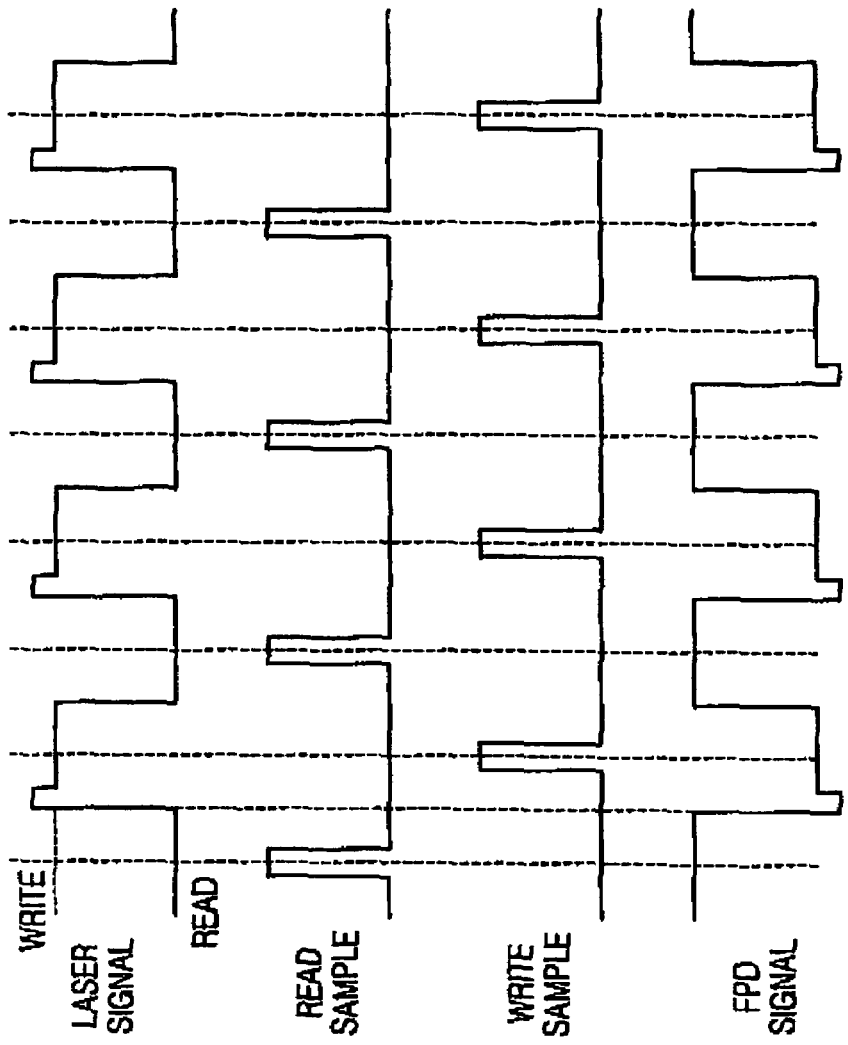
FIGS. 4A through 4D are waveform diagrams of conventional sampling signals and a conventional front monitor photodiode (FPD) signal for controlling a power of a laser diode.

FIG. 4 is a FIGS. 4A-4D are waveform diagrams of conventional sampling signals and a conventional FPD signal for controlling a power of a laser diode. The automatic power controller 310 controls a power of a laser diode by sampling an output of the laser diode, comparing the sampling value and a reference value, and feeding back the comparison result. The FPD signal has a reverse phase in comparison to a write signal.

A servo control is performed in a read section. That is, the servo control is performed in the read section, the control state is maintained in a write section, and the servo control is performed in a next read section again. Since a laser power is very high in the write section, it is very difficult to obtain FE and TE signals for the servo control. Accordingly, the servo control is performed in the read section.

Since the FE and TE signals for the servo control is obtained in the read section, a servo control system is designed so as to manage a read level as a reference level. If the read level is unstable, the reference level of the servo control system is unstable. Therefore, the servo control is unstable.

If a write speed of the optical disc drive is increased, a write frequency increases, and if the write frequency is near to a slew rate frequency, the slow tail effect occurs. Due to the slow tail effect, the output of the photodiode cannot exactly reflect the output of the laser diode, and the output level of the laser diode cannot be maintained as a normal value due to an operation of the automatic power controller 310 according to the slow tail effect. That is, the output level of the laser diode, especially the read level, is changed, and the servo control becomes unstable.

Figure 5:
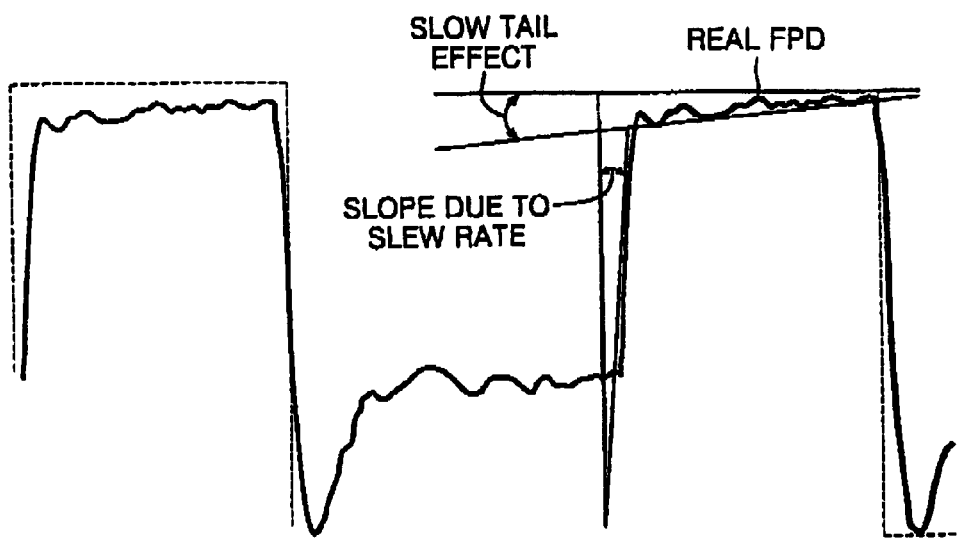
FIG. 5 is a waveform diagram for illustrating a slew rate and a slow trail effect of a conventional photodiode.

FIG. 5 is a waveform diagram for illustrating the slew rate and the slow tail effect of a conventional photodiode. When the output of the laser diode transits from a high level to a low level, that is, when the laser signal level drops from the write level to the read level as illustrated in FIG. 2A, the photodiode can track the output of the laser diode with a certain transient phenomenon and a delay following the transient phenomenon. The transient phenomenon rate is represented using the slew rate, i.e., slew rate=output voltage variation ($\Delta V$)/time variation ($\Delta t$) [V/$\mu$S]. Also, the FPD signal tracks the output of the laser diode with a certain delay and deviation due to the slew rate. This is called the slow tail effect.

A dotted line of FIG. 5 is a waveform of a desirable FPD signal and represents an ideal case where the slow tail effect does not appear. In reality, the slew rate and the slow tail effect will always appear. However, when the read frequency is low, since a read section width is greater than a width influenced by the slew rate, the FPD signal can be regarded as an ideal FPD signal. However, the higher the write frequency, the greater the influence of the slew rate and the slow tail effect.

With reference to FIG. 5, in the read section, the FPD signal and the output of the laser diode are not matched. That is, a certain deviation exists between the FPD signal and the output of the laser diode. If it is assumed that a sampling is performed in the middle of the read section, the FPD signal lies lower than the ideal FPD signal. Therefore, the automatic power controller 310 determines the read level of the laser signal is greater than the reference value and controls to decrease the read level of the laser signal. In FIG. 5, the output of the laser diode has a reverse phase in comparison to the output of the photodiode. Therefore, the read level of the laser signal is as low as 0.9 mW, 0.8 mW, and 0.7 mW. Accordingly, since a servo error signal level becomes low, an operation of the servo system becomes unstable.

In a conventional method, to decrease the influence of the slow tail effect, the read level of the laser signal is compensated with a specified value. However, the method cannot exactly reflect the influence of the slow tail effect, i.e., the deviation between the ideal FPD signal and the real FPD signal. Also, since deviations according to different devices and deviations according to using conditions and used period of times even in the same device are not considered, reliability is low.

In another conventional method, the sampling is performed not in the middle of the read section but in a position as backward as possible (right direction in FIG. 5) from the read section, that is, the sampling is performed in a position where the deviation between the ideal FPD signal and the real FPD signal is minimum. However, since the faster the recording speed, the shorter the read section, the control of the starting time of sampling must be getting more accurate, and even though the starting time of sampling is controlled, a residual error still remains.

In a method of controlling a power of a laser diode according to the disclosed embodiments of the present invention, the influence of the slow tail effect is removed by comparing the read level of the laser signal controlled by an automatic power controller and the reference value for controlling the read level and changing the reference value according to the comparison result.

In contrast to the waveform of FIG. 5, in the method of controlling a power of a laser diode according to disclosed embodiments of the present invention, the automatic power controller maintains the read level of the laser signal at a level such that the slow tail effect does not occur by detecting the deviation between the ideal FPD signal and the real FPD signal and reflecting the deviation value on the reference value applied for controlling the read level. Therefore, since the deviation between the ideal FPD signal and the real FPD signal is detected, the influence of the slow tail effect can be exactly compensated.

The method of controlling a power of a laser diode according to a first embodiment detects the read level of the laser signal controlled by the automatic power controller using an optical detector, normalizes the reference value using the detected value, and adjusts the reference value for the read level by feeding back the normalization result. Therefore, when the slow tail effect occurs, since the automatic power controller controls the read level of the laser signal according to the changed reference value, the read level of the laser signal becomes stable. Accordingly, the servo control becomes stable.

Figure 6:
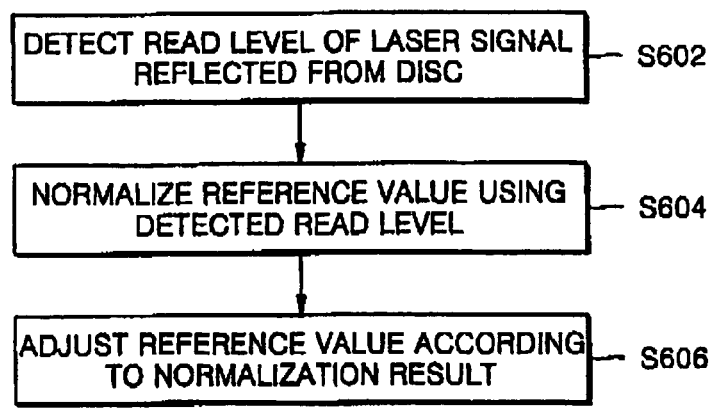
FIG. 6 is a flowchart of a method of controlling a power of a laser diode according to a first embodiment of the present invention.

FIG. 6 is a flowchart of a method of controlling a power of a laser diode according to the first embodiment of the present invention. A read level of a laser signal reflected from a disc is detected in operation S602.

A reproduction signal representing the amount of the laser signal reflected from the disc is obtained using an optical detector, which generates an electric signal corresponding to an optical signal reflected from the disc, and an arithmetic unit, which processes optical signals detected by the optical detector. A sum signal and a pushpull signal are used as the reproduction signal. The sum signal is usable as the reproduction signal. Also, the reproduction signal can be generated from a main beam or a side beam.

The read level of the laser signal is detectable by sampling the reproduction signal and performing low pass filtering of the sampling value.

A reference value for the read level is normalized using the detected read level in operation S604. Various normalizing methods are known, including a normalizing method wherein the reference value is divided by the detected read level. The reference value for the read level is typically known by recording media manufacturers. An adaptive adjustment is addable to the reference value for the read level according to the length of marks or spaces. An automatic power controller compares the reference value and the read level detected from an FPD signal and controls the output of the laser diode according to the comparison result.

The reference value for the read level is adjusted according to the normalization result in operation S606.

An operation of the method of controlling a power of a laser diode according to the first embodiment present invention will now be described in with continuing reference to FIG. 6 and contrasting reference to FIG. 5.

If the slow tail effect occurs as illustrated in FIG. 5, the FPD signal output from the photodiode is different from the ideal FPD signal represented by the dotted line and cannot exactly represent variation of the output of the laser diode. In FIG. 5, the real FPD signal is sampled with a level lower than the ideal FPD signal in the read section. According to the sampling result, the automatic power controller determines that the read level of the laser signal is greater than the reference value and decreases the output of the laser diode. For example, the read level of the laser signal decreases to about 0.9 mW.

Since the automatic power controller assumes that the real FPD signal is the ideal FPD signal, the automatic power controller performs a normal control operation. However, in reality, since the real FPD signal is not the ideal FPD signal, the control result is different from the ideal result. That is, though the correct value of the read level of the laser signal is 1 mW, due to the slow tail effect, the automatic power controller will consider a correct value of 0.9 mW. It is observed that the read level of the laser signal decreases as much as about 30% due to the slow tail effect.

Therefore, if the FPD signal variation due to the slow tail effect is not compensated by a proper method, the read level of the laser signal output from the laser diode is maintained with an abnormal value. Accordingly, the amplitude of the reproduction signal decreases, and according to the result, the servo control operation of the optical disc is unstable.

In the present embodiment, illustrated in FIG. 6, since the read level of the laser signal is detected by the optical detector, and the reference value for controlling the read level of the laser signal is adjusted according to the detection result, the read level of the laser signal is maintained with a normal value, and the servo control operation of the optical disc is stable.

The read level of the laser signal is detected using the optical detector receiving the laser signal reflected from the optical disc.

Figure 7:
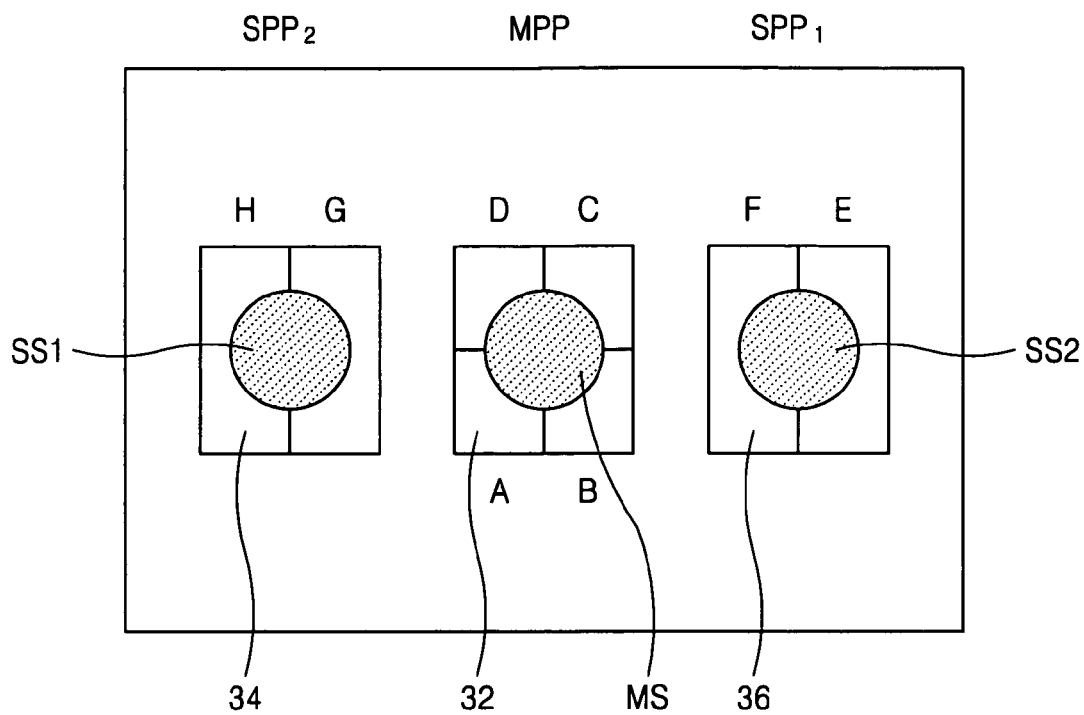
FIG. 7 illustrates an optical detector for an optical disc player to which the first embodiment is applicable, which uses a differential push-pull (DPP) method.

FIG. 7 illustrates an optical detector for an optical disc player to which the first embodiment is applicable, which uses a differential push-pull (DPP) method.

In the DPP method, a main spot MS and two side spots SS1 and SS2 are used. A diffraction grating is installed on a path of a light beam generated by a laser light source, a main beam, which is a 0th order diffracted light beam, and two side beams, which are first order diffracted light beams, are formed, the main spot MS by the main beam is used for a signal recording or reproduction, and the side spots SS1 and SS2 by the side beams are used for a TE detection. The spots are separated by a track pitch by each other.

That is, with reference to FIG. 7, a main optical detector 32 receiving the main spot MS is vertically and horizontally divided into 4 pieces, and side optical detectors 34 and 36 receiving the side spots SS1 and SS2 are vertically divided into 2 pieces, respectively.

A main sum signal, a sub sum signal, and a pushpull signal can be obtained from optical detection signals output from the optical detector illustrated in FIG. 7, and in the present embodiment, the main sum signal and the sub sum signal are used. The main sum signal is obtained by summing all the optical detection signals generated by the main optical detector 32, and the sub sum signal is obtained by summing all the optical detection signals generated by the sub optical detectors 34 and 36.

The phase-change-type recording film is used for the CD-RW, and in the phase-change-type recording film, the crystalline state and the amorphous state coexist while a recording operation is performed. Therefore, since the amount of a reflected light cannot maintain an equal value in a state that the crystalline state and the amorphous state coexist, the sub sum signal rather than the main sum signal is used.

However, since the organic color coating recording film is used for the CD-R, a case where the crystalline state and the amorphous state coexist does not exist. Therefore, the main sum signal or the sub sum signal is usable.

Figure 8:
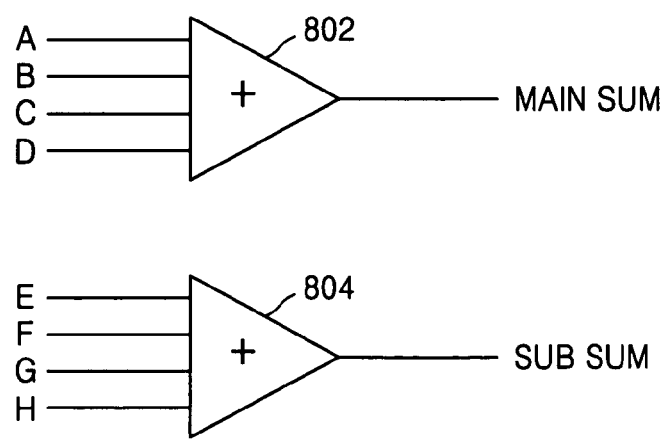
FIG. 8 illustrates generation of a main sum signal and a sub sum signal of the optical detector of FIG. 7.

FIG. 8 illustrates generation of the main sum signal and the sub sum signal generated by the optical detector illustrated in FIG. 7.

If output signals of the optical detectors are represented with A, B, C, D, E, F, G, and H, respectively, a main optical detection signal adder 802 adds all the optical signals A, B, C, and D generated from the main optical detector 32 and outputs the added signal as the main sum signal. A side optical detection signal adder 804 adds all the optical signals E, F, G, and H generated from the side optical detectors 34 and 36 and outputs the added signal as the sub sum signal.

The laser signal level in the read section, is obtained by sampling the laser signal. The detected read level is proportional to the output level of the laser diode in the read section. The proportional relationship is determined by a reflectance of the optical disc.

Therefore, the read level of the laser signal output from the laser diode is detected by performing the low pass filtering of the sampling laser signal and amplifying the result using an operational amplifier with consideration of the reflectance of the optical disc.

The detected read level represents the read level changed by an automatic power controller and is lower than the normal value such that illustrated in FIG. 4.

The reference value necessary for controlling the read level is normalized using the detected read level.

If the detected read level is normal, a normalization coefficient with a value of 1 is obtained by the normalization. However, since the detected read level is lower than the normal read level, the normalization coefficient with a value of more than 1 is obtained by normalization.

The reference value is adjusted by feeding back the normalization result. That is, if the normalization coefficient is different from that of a case where the influence of the slow tail effect does not exist, the reference value is adjusted by the difference.

Then, the automatic power controller controls the read level of the laser signal according to the sampling result of the changed reference value and the FPD signal. Since the changed reference value is greater than the original reference value in FIG. 5, the automatic power controller determines that the read level of the laser signal is smaller than the changed reference value and raises the read level of the laser signal to the normal read level. Accordingly, the amplitude of the reproduction signal is recovered to a state where the slow tail effect does not occur, and the servo control operation becomes stable.

Figure 9:
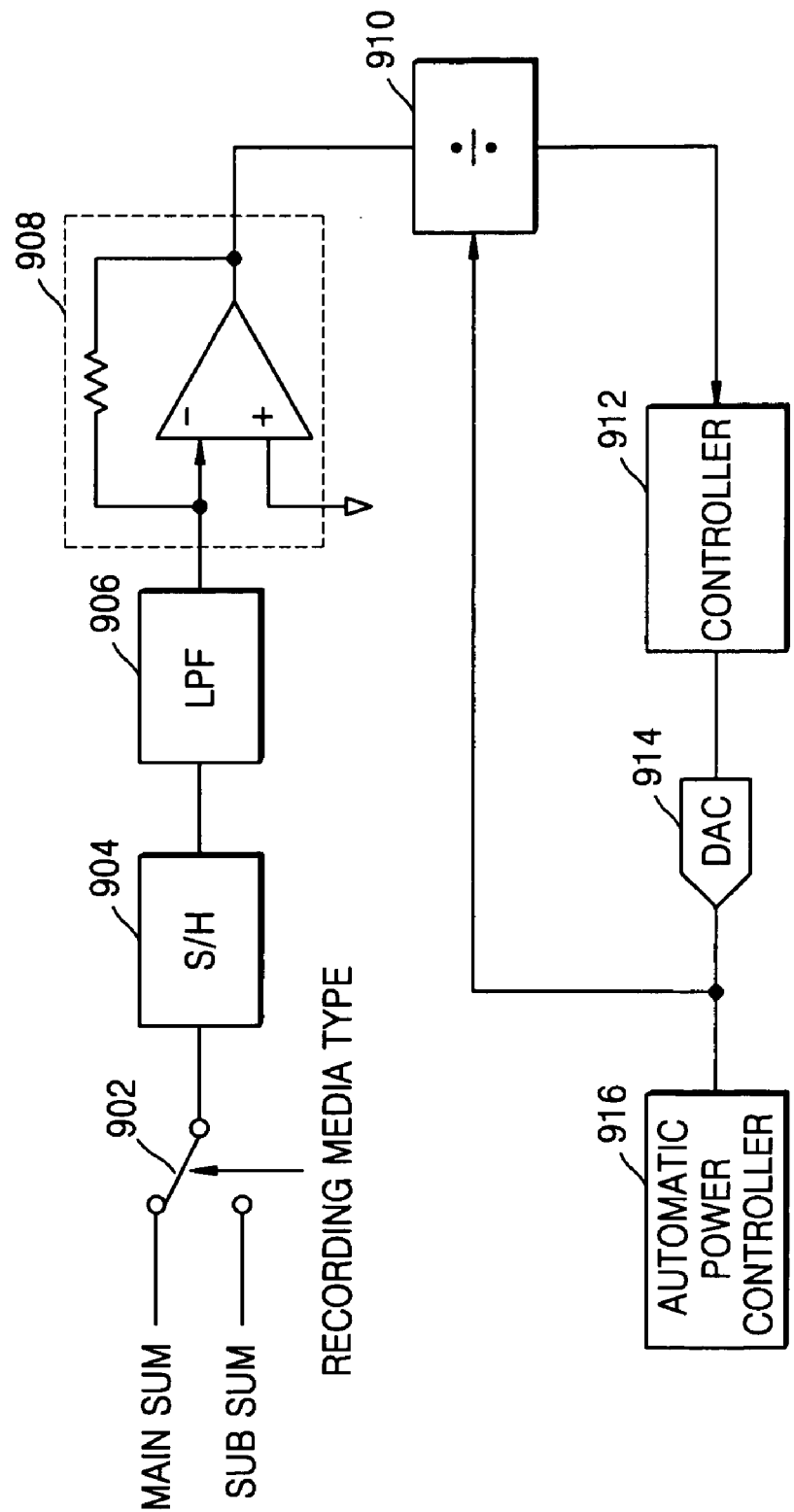
FIG. 9 is a block diagram of an apparatus for controlling a power of a laser diode according to a second embodiment of the present invention.

FIG. 9 is a block diagram of an apparatus for controlling a power of a laser diode according to a second embodiment of the present invention. The apparatus includes a switch 902, a sample & hold device 904, a low pass filter 906, an operational amplifier 908, and a normalizer 910.

The switch 902 switches a main sum signal and a sub sum signal and selectively outputs one of the main sum signal and the sub sum signal according to a media type.

The sample & hold device 904 samples the output of the switch 902. That is, the sample & hold device 904 samples the output of the switch 902 in a read section.

The low pass filter 906 performs low pass filtering of the output of the sample & hold device 904. The operational amplifier 908 compensates a difference due to the reflectance.

The normalizer 910 normalizes the read level of the reproduction signal and the reference value for controlling the read level and is realized with a divider.

A controller 912 adjusts the reference value supplied to an automatic power controller 916 according to a normalization coefficient output from the normalizer 910.

The automatic power controller 916 compares the reference value supplied via a digital-to-analog converter (DAC) 914 and an FPD signal sampling value and controls the read level of the laser diode according to the comparison result.

In the apparatus illustrated in FIG. 9, a reference value adjustment timing is controlled by the controller 912. The controller 912 changes the reference value referring to the normalization result at a recording speed, at which the slow tail effect due to the photodiode directly influences the servo control operation.

Since the slew rate frequency of the photodiode is determinable referring to a specification of the laser diode, the recording speed, at which the slow tail effect due to the photodiode can directly influence the servo control operation is also determinable. Since the slow tail effect typically occurs from more than a 16× velocity, the controller 912 is programmable so as to change the reference value referring to the normalization result from more than the 16× velocity.

Also, the controller 912 controls a switching operation of the switch 902 according to the recording media type. The recording media type is checked by an optical disc player after an optical disc is installed thereon, and information representing the recording media type is referred by the controller 912.

When the recording medium is an organic-color-type recording medium, i.e., a CD-R series optical disc, the controller 912 controls so that the switch 902 selects and outputs the main sum signal output from the main optical detector. When the recording medium is a phase-change-type recording medium, i.e., a CD-RW series optical disc, the controller 912 controls so that the switch 902 selects and outputs the sub sum signal output from the sub optical detector.

The disclosed embodiments of present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing.

As described above, since a method of controlling a power of a laser diode according to the present invention detects a read level of a laser signal via an optical detector and maintains the read level of the laser signal at normal value by adjusting a reference value for controlling the read level of the laser signal according to the detection result, a servo control operation is stable.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of controlling a power of a light emitter to stabilize an output level of the light emitter by comparing a reference value and a sampling output value of a photodiode monitoring the output of the light emitter and by controlling the output of the light emitter according to the comparison result, comprising:

detecting an intensity of a laser signal reflected from a recording medium;

normalizing the reference value using the detected intensity; and adjusting the reference value using the normalization result.

2. The method of claim 1, wherein the reference value is usable to set a read level of the laser diode, and the intensity of the laser signal is detected in a read section of the laser signal.

3. The method of claim 1, wherein the light emitter is a laser diode.

4. The method of claim 2, wherein an intensity of a laser signal is obtained by sampling outputs of a main optical detector receiving a main beam output from the light emitter.

5. The method of claim 2, wherein the intensity of the laser signal is obtained by sampling outputs of a sub optical detector receiving a sub beam output from the light emitter.

6. The method of claim 1, wherein the reference value is normalized by using the detected intensity.

7. The method of claim 6, wherein the reference value is divided by the detected intensity in the normalizing of the reference value.

8. The method of claim 1, wherein the laser signal is one of sum signal and a push pull signal.

9. The method of claim 1, wherein the laser signal is generated from one of a main beam and a side beam.

10. The method of claim 1, wherein the read time of the laser signal is detectable by sampling the reproduction signal and low pass filtering the sampled value.

11. The method of claim 6, further comprising adding an adaptive adjustment to the reference value according to lengths of one of marks and spaces on the recording medium.

12. An apparatus for controlling a power of a light emitter to stabilize an output level of the laser diode by comparing a reference value and a sampling output value of a photodiode monitoring the output of the laser diode and by controlling the output of the laser diode according to the comparison result, comprising:

a sample and hold device which detects an intensity of a laser signal reflected from a recording medium;

a normalizer which normalizes the reference value using the value sampled by the sample and hold device; and a controller which adjusts the reference value using an output of the normalizer.

13. The apparatus of claim 12, wherein the light emitter is a laser diode.

14. The apparatus of claim 12, wherein the reference value is usable to set a read level of the laser diode, and the sample and hold device performs sampling in a read section of the light emitter.

15. The apparatus of claim 12, further comprising a low pass filter between the sample and hold device and the normalizer and performs low pass filtering of an output of the sample and hold device.

16. The apparatus of claim 12, further comprising a switch which selects one of an output of a main optical detector receiving a main beam output from the light emitter and an output of a sub optical detector receiving a sub beam output from the light emitter and which outputs the selected one to the sample and hold device.

17. The apparatus of claim 12, wherein the switch selects and outputs the output of the main optical detector when the recording medium is of an organic-color-type medium and outputs the output of the sub optical detector when the recording medium is of a phase-change-type recording medium.

18. The apparatus of claim 12, further comprising a recording media type detector which detects a type of the recording medium installed in the apparatus.

19. The apparatus of claim 12, wherein the normalizer is a divider that divides the reference value by an output of the sample and hold device.

20. The apparatus of claim 12, wherein the controller adjusts the reference value at a recording speed where a recording frequency is near a slew rate frequency of the photodiode.

21. The apparatus of claim 12, wherein the slew rate of the photodiode is specified.

22. The apparatus of claim 12, further comprising a media checker which checks the type of the disc.

23. The apparatus of claim 22, wherein the media checker checks after the disc is installed.

24. A computer-readable storage medium encoded with processing instructions for causing a computer to perform a method of controlling a power of a light emitter to stabilize an output level of the light emitter by comparing a reference value and a sampling output value of a photodiode monitoring the output of the light emitter and by controlling the output of the light emitter according to the comparison result, comprising:

detecting an intensity of a laser signal reflected from a disc;

normalizing the reference value using the detected intensity; and adjusting the reference value using the normalization result.

25. A method of removing the influence of a slow tail effect, comprising:

comparing a read level of a laser signal controlled by an automatic power controller and a reference value for controlling the read level; and changing the reference value according to a result of the comparing, wherein the automatic power controller controls the read level such that the slow tail effect does not occur by:

detecting a deviation between an ideal front monitor photodiode (FPD) signal resulting from the laser signal and an actual FPD signal resulting from the laser signal being incident on the FPD; and using a value of the detected deviation in the changing.

26. The method of claim 25, further comprising:

normalizing the reference value using the read value; and changing the reference value using the normalized reference value.

27. The method of claim 26, wherein, when the slow tail effect occurs, the automatic power controller controls the read level of the laser signal according to the changed reference value so that the read level of the laser signal becomes stable.

28. The method of claim 25, wherein an optical sensor detects the read level.

* * * * *